United States Patent
Dernis et al.

(10) Patent No.: US 7,831,748 B2
(45) Date of Patent: Nov. 9, 2010

(54) EXTENDED USB PROTOCOL WITH SELECTIVE BROADCAST MECHANISM

(75) Inventors: Mitchell Stephen Dernis, Seattle, WA (US); Ankur Varma, San Francisco, CA (US); Wei Guo, Sammamish, WA (US); Eiko Junus, San Jose, CA (US); Gregory George Williams, Menlo Park, CA (US); Harjit Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 10/915,065

(22) Filed: Aug. 10, 2004

(65) Prior Publication Data

US 2006/0036780 A1 Feb. 16, 2006

(51) Int. Cl.
G06F 3/00 (2006.01)
G06F 13/20 (2006.01)
G06F 13/00 (2006.01)
H04L 12/56 (2006.01)
H04L 12/28 (2006.01)

(52) U.S. Cl. .............. 710/36; 710/8; 710/12; 710/14; 710/37; 710/49; 710/313; 710/317; 370/392; 370/402

(58) Field of Classification Search ............. 710/36, 710/313; 370/395.4
See application file for complete search history.

(56) References Cited

U.S. PATENT DOCUMENTS

| | | | | |
|---|---|---|---|---|
| 5,623,217 A * | 4/1997 | Britton et al. | .......... | 326/40 |
| 5,715,405 A * | 2/1998 | McClear et al. | .......... | 710/100 |
| 5,781,796 A * | 7/1998 | Lee | .......... | 710/8 |
| 5,784,581 A | 7/1998 | Hannah | .......... | 395/290 |
| 6,182,185 B1 * | 1/2001 | Stokes | .......... | 710/317 |
| 6,272,644 B1 * | 8/2001 | Urade et al. | .......... | 713/320 |
| 6,359,951 B1 * | 3/2002 | Morriss et al. | .......... | 375/377 |
| 6,389,029 B1 * | 5/2002 | McAlear | .......... | 370/402 |
| 6,512,817 B1 * | 1/2003 | Dale et al. | .......... | 379/9.05 |
| 6,622,178 B1 * | 9/2003 | Burke et al. | .......... | 710/15 |
| 6,732,218 B2 * | 5/2004 | Overtoom et al. | .......... | 710/313 |
| 6,993,032 B1 * | 1/2006 | Dammann et al. | .......... | 370/395.7 |
| 6,993,620 B2 * | 1/2006 | Ferguson | .......... | 710/313 |

(Continued)

FOREIGN PATENT DOCUMENTS

EP    1 372 081 A2    12/2003

(Continued)

OTHER PUBLICATIONS

Axelson, Jan. "USB Complete," Second Edtion (2001).*

(Continued)

*Primary Examiner*—Tariq R. Hafiz
*Assistant Examiner*—Henry Yu
(74) *Attorney, Agent, or Firm*—Woodcock Washburn LLP

(57) ABSTRACT

An extension to the Universal Serial Bus (USB) protocol that utilizes reserved bits in the OHCI Endpoint Descriptors to signal which root hub port(s) should transmit the data. Typically, all ports transmit (broadcast) data. The present invention encodes transmission information that can be used by the hardware to effectively control which port(s) need to be tri-stated. However, by setting, the "on" bits for all the ports, the present invention retains standard USB functionality. Also provided is a method to increase the bandwidth of low speed devices connected to the USB bus by increasing the data payload for such devices.

12 Claims, 4 Drawing Sheets

U.S. PATENT DOCUMENTS

| | | | |
|---|---|---|---|
| 7,099,980 B1* | 8/2006 | Magnuson et al. | 710/301 |
| 7,242,766 B1* | 7/2007 | Lyle | 380/2 |
| 7,284,081 B2* | 10/2007 | Siddappa | 710/312 |
| 7,373,522 B2* | 5/2008 | Leaming | 713/193 |
| 7,395,365 B2* | 7/2008 | Fujita et al. | 710/313 |
| 7,460,535 B2* | 12/2008 | Govindaraman | 370/392 |
| 7,502,878 B1* | 3/2009 | Wright | 710/37 |
| 2002/0194514 A1* | 12/2002 | Sanchez | 713/300 |
| 2003/0056050 A1* | 3/2003 | Moro | 710/301 |
| 2004/0008684 A1* | 1/2004 | Garney et al. | 370/395.4 |
| 2004/0225799 A1* | 11/2004 | Leaming | 710/301 |
| 2004/0237110 A1* | 11/2004 | Jones, Jr. | 725/74 |
| 2005/0180388 A1* | 8/2005 | Siddappa | 370/351 |

FOREIGN PATENT DOCUMENTS

| | | |
|---|---|---|
| EP | 1372081 A2 * | 12/2003 |
| JP | 11096112 | 4/1997 |

OTHER PUBLICATIONS

"OpenHCI: Open Host Controller Interface Specification for USB," Release 1.0a (Sep. 14, 1999).*

"Universal Serial Bus Mass Storage Class: UFI Command Specification," Revision 1.0 (Dec. 14, 1998).*

"Universal Serial Bus Specification," Revision 1.1 (Sep. 23, 1998).*

"USB Serial Bus Specification," Revision 1.1 (Sep. 23, 1998).*

Chia, Ian. "USB 2.0 Frequently Asked Questions—USB 2.0 versus USB 1.1." Everythingusb.com. Jul. 9, 2001. May 10, 2007. Retrieved from http://web.archive.org/web/20011107205048/www.everythingusb.com/usb2/faqb.htm—Reference discloses that USB 2.0 is indeed compatible with USB 1.1.*

Lin, Charles C. "What's a Tri-state Buffer?" "Computer Organization." University of Maryland Department of Computer Science. 2003. May 22, 2008. Retrieved from <http://web.archive.org/web/20031024232826/http://www.cs.umd.edu/class/spring2003/cmsc311/Notes/CompOrg/tristate.html>.*

Universal Serial Bus Specification, *Compaq Computer Corporation, Intel Corporation, Microsoft Corporation, NEC Corporation*, 1998, Revision 1.1, 1-311.

OpenHCI, Open Host Controller Interface Specification for USB, *Compaq Computer Corporation, Microsoft Corporation, National Semiconductor*, 1999, Release 1.0a, 1-146.

* cited by examiner

Fig. 2

| | 31 | 26 | 16 15 | 14 | 13 | 12 | 11 10 | 07 06 05 04 | 03 02 01 00 |
|---|---|---|---|---|---|---|---|---|---|
| Dword 0 | — | MPS | F | K | S | D | EN | FA | |
| Dword 1 | TD Queue Tail Pointer (TailP) | | | | | | | | — |
| Dword 2 | TD Queue Head Pointer (HeadP) | | | | | | | 0 | C | H |
| Dword 3 | Next Endpoint Descriptor (NextED) | | | | | | | | — |

Fig. 3

| Name | HC Access | Description |
|---|---|---|
| FA | R | FunctionAddress<br>This is the USB address of the function containing the endpoint that this ED controls |
| EN | R | EndpointNumber<br>This is the USB address of the endpoint within the function |
| D | R | Direction<br>This 2-bit field indicates the direction of data flow (IN or OUT.) If neither IN nor OUT is specified, then the direction is determined from the PID field of the TD. The encoding of the bits of this field are:<br><br>| Code | Direction |<br>|---|---|<br>| 00b | Get direction From TD |<br>| 01b | OUT |<br>| 10b | IN |<br>| 11b | Get direction From TD | |
| S | R | Speed<br>Indicates the speed of the endpoint: full-speed (S = 0) or low-speed (S = 1.) |
| K | R | sKip<br>When this bit is set, the HC continues on to the next ED on the list without attempting access to the TD queue or issuing any USB token for the endpoint |
| F | R | Format<br>This bit indicates the format of the TDs linked to this ED. If this is a Control, Bulk, or Interrupt Endpoint, then F = 0, indicating that the General TD format is used. If this is an Isochronous Endpoint, then F = 1, indicating that the Isochronous TD format is used. |
| MPS | R | MaximumPacketSize<br>This field indicates the maximum number of bytes that can be sent to or received from the endpoint in a single data packet |
| TailP | R | TDQueueTailPointer<br>If TailP and HeadP are the same, then the list contains no TD that the HC can process. If TailP and HeadP are different, then the list contains a TD to be processed. |
| H | R/W | Halted<br>This bit is set by the HC to indicate that processing of the TD queue on the endpoint is halted, usually due to an error in processing a TD. |
| C | R/W | toggleCarry<br>This bit is the data toggle carry bit. Whenever a TD is retired, this bit is written to contain the last data toggle value (LSb of data Toggle field) from the retired TD. This field is not used for Isochronous Endpoints |
| HeadP | R/W | TDQueueHeadPointer<br>Points to the next TD to be processed for this endpoint. |
| NextED | R | NextED<br>If nonzero, then this entry points to the next ED on the list |

Fig. 4

| Offset | Field | Size | Value | Description |
|---|---|---|---|---|
| 0 | bLength | 1 | Number | Size of Descriptor in Bytes (7 bytes) |
| 1 | bDescriptorType | 1 | Constant | Endpoint Descriptor (0x05) |
| 2 | bEndpointAddress | 1 | Endpoint | Endpoint Address<br>Bits 0..3b Endpoint Number.<br>Bits 4..6b Reserved. Set to Zero<br>Bits 7 Direction 0 = Out, 1 = In (Ignored for Control Endpoints) |
| 3 | bmAttributes | 1 | Bitmap | Bits 0..1 Transfer Type<br>00 = Control<br>01 = Isochronous<br>10 = Bulk<br>11 = Interrupt<br>Bits 2..7 are reserved. If Isochronous endpoint,<br>Bits 3..2 = Synchronisation Type (Iso Mode)<br>00 = No Synchronisation<br>01 = Asynchronous<br>10 = Adaptive<br>11 = Synchronous<br>Bits 5..4 = Usage Type (Iso Mode)<br>00 = Data Endpoint<br>01 = Feedback Endpoint<br>10 = Explicit Feedback Data Endpoint<br>11 = Reserved |
| 4 | wMaxPacketSize | 2 | Number | Maximum Packet Size this endpoint is capable of sending or receiving |
| 6 | bInterval | 1 | Number | Interval for polling endpoint data transfers. Value in frame counts. Ignored for Bulk & Control Endpoints. Isochronous must equal 1 and field may range from 1 to 255 for interrupt endpoints. |

US 7,831,748 B2

EXTENDED USB PROTOCOL WITH SELECTIVE BROADCAST MECHANISM

FIELD OF THE INVENTION

This invention relates in general to the field of computing devices. More particularly, this invention relates to a system and method of extending the universal serial bus (USB) protocol while maintaining backward compatibility.

BACKGROUND OF THE INVENTION

The Universal Serial Bus (USB) protocol has become a standard bus interface in computing devices that is used for many different applications. This interface is based on a broadcast mechanism wherein data is sent to all devices attached to a central host. The devices accept or reject the sent data based on the device address in the USB packet header. A significant drawback of this approach is that it leads to high Electro-Magnetic Interference (EMI) which necessitates the use of expensive shielding.

In accordance with another aspect of the USB 1.1 protocol, devices connect to the USB bus as either a Low Speed (LS) or a Full Speed (FS) Device. Due to the serial nature of the bus, the maximum bandwidth at LS is 1.5 Mbps. At LS, the protocol stipulates data payloads of 8 bytes, accompanied by 19 bytes of header information. This disadvantageously reduces the effective bandwidth.

Thus, there is a need for extension to the USB protocol that reduces the EMI problem and increases bandwidth at low speed while maintaining backward compatibility. The present invention provides such a solution.

SUMMARY OF THE INVENTION

The present invention is directed to systems and methods for providing an extension to the Open Host Controller Interface (OHCI) design and implementation of the Universal Serial Bus (USB) host controller and host controller software driver components. Because USB uses a broadcast mechanism, all root hub ports transmit all (broadcast) data packets. The present invention augments the USB protocol by utilizing reserved bits in the OHCI Endpoint Descriptors to route individual data packets through specific ports on the root hub. The present invention encodes information that can be used by the hardware to effectively control which port(s) are tri-stated during the transmission of an individual data packet. The present invention can operate in this mode with fully compliant USB 1.1 devices. Additionally, by setting, the "on" bits for all the ports, the present invention also advantageously retains standard USB functionality, which may be useful for debugging with certain USB 1.1 test equipment.

In accordance with a first aspect of the invention there is provided a USB bus in a computing system that includes a USB root hub having a plurality of ports, a USB host connected to the USB interface to transfer data to and from devices attached to the ports using a protocol; and a USB host controller that interfaces the USB host to the computing system. The host controller disables at least one of the ports to direct data to a specific device via the protocol.

In accordance with a feature of the invention, the protocol is compliant with USB revision 1.1. The reserved bits in the USB Endpoint Descriptor may be used to signal which port(s) should transmit data. Port(s) that are not to send data are tri-stated and a port that is to send data is enabled based on a combination of the reserved bits.

In accordance with another feature, when connected devices are not receiving communications via the USB bus, individual packets may be transmitted by the USB host to the attached devices so that they do not enter a suspend state.

In accordance with another feature, a Low Speed (LS) device connected to the USB bus communicates using a data payload of 32 bytes, rather than 8 bytes. The protocol of the present invention may also enable a broadcast of data to all the ports, as well as set a port to transmit to a LS device in a USB 1.1 compliant manner In accordance with yet another feature, a Low Speed (LS) device connected to the USB bus communicates to the computing system having lower emissions than a LS device connected to a USB host that broadcasts data via all ports.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a table describing an OHCI Endpoint Descriptor Format;

FIG. 3 is a table describing the OHCI Endpoint Descriptor Field Definitions;

FIG. 4 is a table describing the USB Endpoint Descriptor.

DETAILED DESCRIPTION OF PREFERRED EMBODIMENTS

Exemplary Computing Environment

Figure 1:
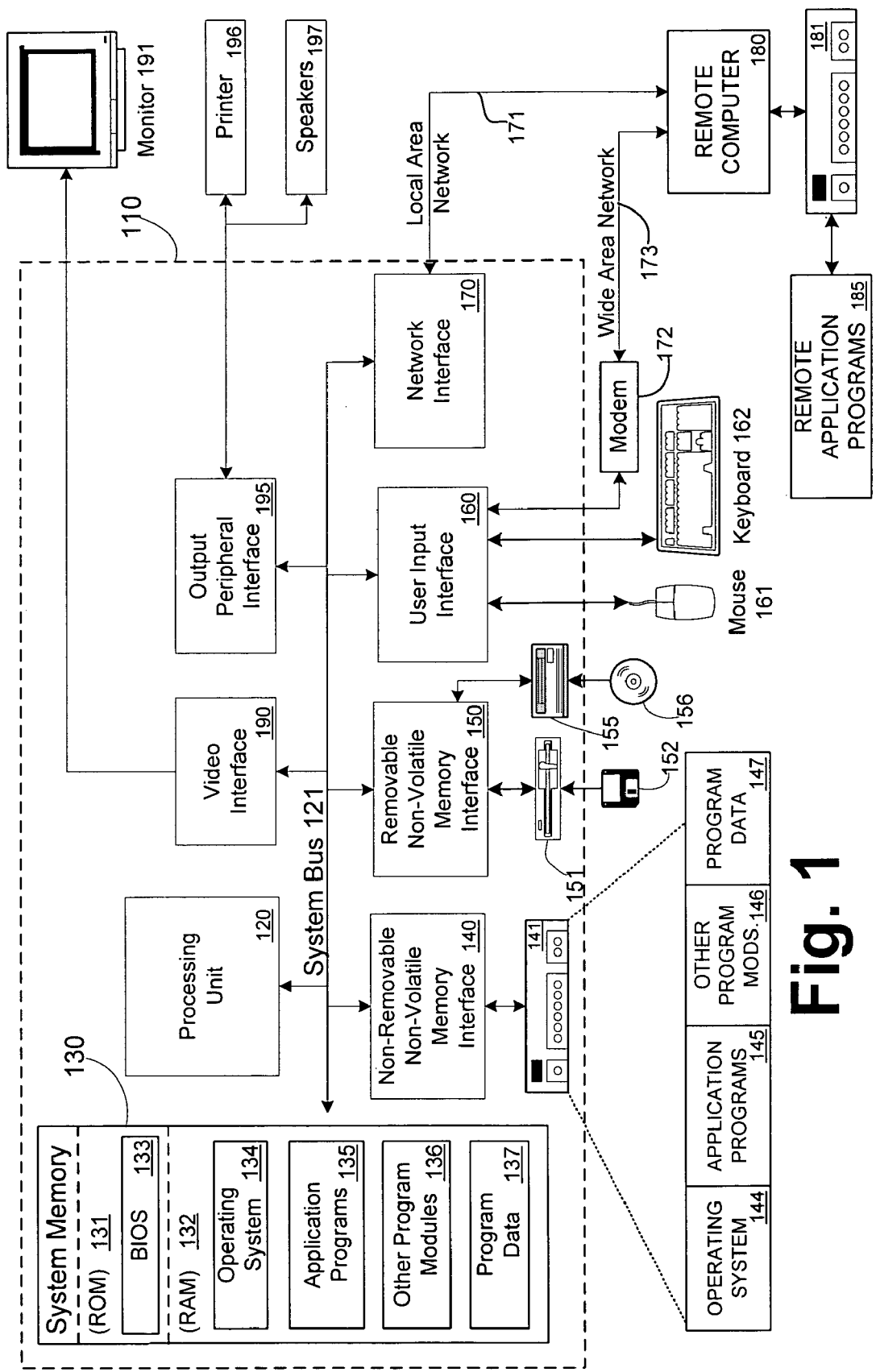
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable, non-volatile memory interface such as interface 140, and magnetic disk drive 151 and optical disk drive 155 are typically connected to the system bus 121 by a removable memory interface, such as non-removable, non-volatile memory interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory storage device 181. It will be appreciated that the network connections shown are exemplary and other means of establishing a communications link between the computers may be used.

Exemplary Embodiments of the Extended USB Protocol

The motivation for the Universal Serial Bus (USB) stems from several advances in computing devices, such as the growing convergence of computing and communications, the need for flexible reconfiguration of the computing devices, and need for additional ports to add external peripherals. As an overview, USB is a cable bus that supports data exchange between a host computer and a wide range of simultaneously accessible peripherals. The attached peripherals share USB bandwidth through a host-scheduled, token-based protocol. The bus allows peripherals to be attached, configured, used, and detached while the host and other peripherals are in operation.

A USB system is described by three definitional component elements: a USB interconnect, USB devices and a USB host. The USB interconnect is the manner in which USB devices are connected to and communicate with the host. The USB interconnect connects USB devices with the USB host. The USB physical interconnect is a tiered star topology having a hub at the center of each star. Each wire segment is a point-to-point connection between the host and a hub or function, or a hub connected to another hub or function. Further detail regarding USB may be found in the Universal Serial Bus Specification, Revision 1.1, Sep. 23, 1998, which is incorporated by reference herein in its entirety.

There is one host in any USB system. The USB interface to the host computer system is referred to as the Host Controller. The Host Controller may be implemented in a combination of hardware, firmware, or software. A root hub is integrated within the host system to provide one or more attachment points.

USB devices may include hubs and USB functions. The hubs provide additional attachment points, whereas USB functions provide additional capabilities to the system, such as an ISDN connection, a digital joystick, or speakers. USB devices present a standard USB interface in terms of the following: their comprehension of the USB protocol, their response to standard USB operations, and their standard capability descriptive information.

Generally, in an example embodiment, the hub will include an upstream port and one or more downstream ports. A downstream port is a port on the hub that is electrically farthest from the host. A downstream port will be coupled to a USB enabled device and will send data traffic up to the host and receive data traffic that is generated from the host and sent downstream to the ports. In contrast, an upstream port is the port on a device electrically closest to the host. The upstream port generally sends data traffic downstream to USB devices.

When operating, if a downstream hub port is enabled (i.e., in a state where it can propagate signaling through the hub) and the hub detects a Start-of-Packet (SOP) on that port, connectivity is established in an upstream direction to the upstream port of that hub, but not to any other downstream ports. This means that when a device or a hub transmits a packet upstream, only those hubs in line between the transmitting device and the host will see the packet. In the downstream direction, hubs operate in a broadcast mode. When a hub detects an SOP on its upstream port, it establishes connectivity to all enabled downstream ports. If a port is not enabled, it does not propagate packet signaling downstream.

As noted above, the USB protocol is based on a broadcast mechanism wherein data is sent to all devices attached to a central host. The devices accept or reject the sent data based on the device address in the USB packet header. The broadcast mechanism adopted by the USB protocol leads to high levels of EMI, which necessitates the use of expensive shielding as there are several FCC regulations governing the maximum EMI that products can emit. The present invention extends the USB protocol by allowing the host driver to disable the broadcast of data and to direct data to specific devices attached to predetermined ports, thus providing an effective way of reducing EMI to within FCC norms.

To accomplish the above, the reserved bits in the OHCI Endpoint Descriptor are used to signal which root hub port(s) should transmit the data. The USB Endpoint Descriptor is known to those of ordinary skill in the art and is detailed in the table of FIGS. 2 and 3. In accordance with the present invention, the information to be transmitted to a device attached to a particular port is encoded via the reserved bits to control which port(s) are tri-stated and which port is enabled to send data. For example, if five ports are implemented, the port number is encoded for each transaction in the Endpoint Descriptor using the reserved bits DWord0[29:27] as follows:

001—send data to port 1, tri-state ports 2, 3, 4 and 5
010—send data to port 2, tri-state ports 1, 3, 4 and 5
011—send data to port 3, tri-state ports 1, 2, 4 and 5
100—send data to port 4, tri-state ports 1, 2, 3 and 5
101—send data to port 5, tri-state ports 1, 2, 3 and 4
111—tri-state all ports
000—broadcast to all ports It is noted that the present invention is not limited to five ports, as additional or few ports may be controlled via using additional/fewer reserved bits in the Endpoint Descriptor. Also, setting the "on" bits for all ports (e.g., 000), the present invention advantageously retains standard USB functionality by implementing a broadcast mode.

When connected devices are not receiving communications via the USB bus, individual packets are routed to the devices so that the attached devices do not enter a suspend state. This advantageously keeps the device in an active state, rather than having to wake devices from the suspend state, which takes a significant amount of time.

By transmitting signals to ports in the manner described above, lower cost solutions that employ the USB protocol can be manufactured while reducing the need for expensive shielding.

In addition to the above, the USB 1.1 standard allows devices to connect as either a Low Speed (LS) or a Full Speed (FS) device. A LS device attaches to the host at a 1.5 MHz interface speed, where a FS device attaches to the host at a 12 MHz interface speed. The present invention improves the bandwidth of LS devices by extending the maximum data payload to 32 bytes. The payload size of a USB Endpoint is specified in the wMaxPacketSize field of the USB Endpoint Descriptor, shown in FIG. 4. This allows a device to communicate the size of its FIFO to the host system. USB 1.1 specifies that a Low Speed device must not set wMaxPacketSize to greater than 8 bytes for any of its endpoints. The combination of host controller hardware and software enforces this limit. While some OHCI hardware is agnostic to the limit and will readily allow larger LS packet sizes, the extended OHCI host controller of the present invention will interoperate correctly with LS devices that support the larger data-payload, and with those that do not. However, devices that utilize the larger data-payload will operate only with the enhanced host controller system (software and hardware) of the present invention, unless they can be placed in a mode where use of that endpoint is not necessary.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A USB bus in a computing system, comprising:
    a USB root hub having a plurality of downstream ports and an upstream port;
    a USB host connected to the upstream port to transfer data to and from devices attached to said downstream ports;
    a USB host controller that interfaces the USB host to the computing system,
    wherein the root hub is configured to receive data packets from the upstream port and broadcast the data packets to active downstream ports, wherein a downstream port is active when a powered device is coupled to the downstream port;
    wherein the host controller is configured, based on information in individual data packets, to broadcast the data packets to all active downstream ports in a first mode of operation;
    wherein the host controller is configured, based on information in the individual data packets, to disable a transmission of individual data packets broadcasted to a specific active downstream port by blocking the individual data packets broadcasted to said specific port of said USB root hub in a second mode of operation; and
    wherein the host controller is configured to periodically send pulses operable to keep an active device in an active state to the specific downstream port in the second mode of operation while blocking the individual data packets.

2. The USB bus of claim 1, wherein the first mode of operation is compliant with USB revision 1.1.

3. The USB bus of claim 2, wherein the information in each individual data packets is located within reserved bits in an Endpoint Descriptor.

4. The USB bus of claim 3, said reserved bits are at DWord0.

5. The USB bus of claim 1, wherein said host controller is configured to extend a payload of a data packet to 32 bytes for a low speed device.

6. The USB bus of claim 1, wherein the second mode of operation operates such that said USB bus is compliant with a USB 1.1 standard and reduces an amount of electro magnetic interference that occurs due to complying with said USB 1.1 standard.

7. A method of communicating over a USB bus in a computing system having a USB host controller that interfaces the USB bus to the computing system, comprising:
    receiving, by a USB root rub coupled to an upstream port of a USB host, data from the upstream port and broadcasting all the data to active downstream ports in a first mode of operation, wherein said USB root hub is configured to operate in said first mode of operation based on information in individual data packets, wherein the USB root hub includes a plurality of downstream ports and the upstream port;
    disabling, based on information stored in the individual data packets, a transmission of individual data packets broadcasted to a specific active downstream port in a second mode of operation, wherein the transmission of individual data packets is disabled by blocking the individual data packets broadcasted to said specific port, wherein a downstream port is in an active state when a powered device is coupled to the downstream port; and
    maintaining a powered device coupled to said specific downstream port in an active state while the transmission of data is disabled by periodically sending pulses to the specific downstream port, wherein the powered device will enter a suspend state when broadcasted data is not received within a predetermined period of time.

8. The method of claim 7, wherein said first mode of operation is compliant with USB revision 1.1.

9. The method of claim 8, wherein the information in each individual data packet is located within reserved bits in an Endpoint Descriptor.

10. The method of claim 9, further comprising:
    tri-stating port(s) that are not to send data; and
    enabling a port that is to transmit data based on a combination of said reserved bits.

11. The method of claim 9, wherein said reserved bits are at Dword0.

12. The method of claim 7, wherein the second mode of operation operates such that said USB bus is compliant with a USB 1.1 standard and reduces an amount of electro magnetic interference that occurs due to complying with said USB 1.1 standard.

* * * * *